(12) United States Patent
Papp et al.

(10) Patent No.: US 6,476,110 B1
(45) Date of Patent: Nov. 5, 2002

(54) RUBBER COMPOSITION CONTAINING SOLID MAGNETIZABLE PARTICLES OF GREATER STIFFNESS THAN THE RUBBERY COMPOUNDS

(75) Inventors: Frank Paul Papp, Charlotte, NC (US); Duane Marle Oxley, Fort Mill, SC (US); James Michael Giustino, Waxhaw, NC (US)

(73) Assignee: Continental AG, Hannover (DE)

( * ) Notice: Subject to any disclaimer, the term of this patent is extended or adjusted under 35 U.S.C. 154(b) by 0 days.

(21) Appl. No.: 09/506,332

(22) Filed: Feb. 18, 2000

(51) Int. Cl.[7] .............. C08J 3/22; C08K 3/10; C08K 3/22; C08K 3/34; C08K 5/372; C08L 9/00; C04B 35/26; B60C 13/00

(52) U.S. Cl. ............. 524/262; 524/431; 524/436; 524/571; 524/572; 252/62.54; 252/62.63; 152/525; 523/351

(58) Field of Search ............... 524/262, 431, 524/436, 571, 572; 252/62.51 R, 62.54, 62.63; 152/524, 525, 152.1, 198; 523/351

(56) References Cited

U.S. PATENT DOCUMENTS

| | | | | |
|---|---|---|---|---|
| 3,225,810 A | * | 12/1965 | Enabnit | ............ 156/110.1 |
| 3,750,120 A | * | 7/1973 | McCarty | ............ 360/1 |
| 4,081,014 A | * | 3/1978 | Searle | ............ 152/520 |
| 4,210,459 A | * | 7/1980 | Williams et al. | ............ 106/489 |
| 4,714,734 A | * | 12/1987 | Hashimoto et al. | ............ 524/496 |
| 5,368,082 A | * | 11/1994 | Oare et al. | ............ 152/517 |
| 5,396,940 A | * | 3/1995 | Segatta et al. | ............ 152/454 |
| 5,565,047 A | * | 10/1996 | Tanaka | ............ 152/454 |
| 5,895,854 A | * | 4/1999 | Becherer et al. | ............ 73/514.39 |
| 5,900,449 A | | 5/1999 | Custodero et al. | |
| 5,932,649 A | * | 8/1999 | Hergenrother et al. | ...... 524/588 |
| 5,988,248 A | * | 11/1999 | Sandstrom | ............ 152/524 |
| 6,005,027 A | * | 12/1999 | Guillet et al. | ............ 523/209 |
| 6,017,980 A | * | 1/2000 | Wang et al. | ............ 523/215 |
| 6,033,597 A | * | 3/2000 | Yatsuyanagi et al. | .. 252/182.17 |
| 6,077,874 A | * | 6/2000 | Wideman et al. | ......... 521/42.5 |
| 6,228,933 B1 | | 5/2001 | Hiles | |

FOREIGN PATENT DOCUMENTS

| | | |
|---|---|---|
| EP | 0810258 | 12/1997 |
| EP | 0849597 | 6/1998 |
| WO | 00/74541 | 12/2000 |

OTHER PUBLICATIONS

Anantharaman M. R. et al., "On the Incorporation of Magnetic Fillers in Elastomer Matrices", Kautschuk und Gummi–Kunststoffe, DE, DR., Heidelberg Bd. 49, Nr. 6, Jun. 1, 1996, Seiten 424–426.

* cited by examiner

Primary Examiner—Vasu Jagannathan
Assistant Examiner—Callie E. Shosho
(74) Attorney, Agent, or Firm—Greenblum & Bernstein, P.L.C.

(57) ABSTRACT

Rubber compositions filled with an unusually high content of solid magnetizable particles such as iron oxide or strontium ferrite but having great resistance to crack initiation and crack growth. This allows generation of strongly magnetized areas in rubber articles built with a rubber composition according this invention. This gives—also in those applications where a large distance between a row of magnetized areas and a sensor is necessary due to deformation—well-reproducible and well-recognizable signals despite existence of disturbing magnetic fields. The magnetizable particles are bonded to a rubber matrix by a bonding agent, namely an organo-functional silane.

16 Claims, 3 Drawing Sheets

RUBBER COMPOSITION CONTAINING SOLID MAGNETIZABLE PARTICLES OF GREATER STIFFNESS THAN THE RUBBERY COMPOUNDS

BACKGROUND OF THE INVENTION

1. Field of the Invention

The present invention relates to rubber compositions and methods of making. More particularly, the present invention relates to rubber compositions including solid magnetizable particles bonded to the rubber matrix and methods of making.

2. Description of Background Information

The present invention is especially directed to a further improvement upon the invention described in U.S. Pat. No. 5,913,240 entitled "Method and Device for Controlling Slip and/or for Determining the Longitudinal Force or Flex Work-Proportional Parameter, and Vehicle Tire Therefore", assigned to Continental AG and incorporated herein by reference. Further, the present invention is preferably combined with the disclosure of DE 196 46 251 of the same assignee. U.S. Pat. No. 5,895,854, which is also incorporated herein by reference, claims priority of this German application.

Beside the patents mentioned above and incorporated herein, we became aware of German patent applications DE 195 03 468 C1 and DE 195 03 469 C1, both being published May 30, 1996 and citing U.S. Pat. Nos. 4,161,120; 4,948, 277; 5,017,868; 5,026,178; 5,131,763; 5,261,752; and 5,261,753.

Further, we became aware of European patent applications EP 0 890 752 A2 and EP 0 890 753 A2, both published Jan. 13, 1999; and EP 0 892 185 A2, published Jan. 20, 1999.

OBJECTS AND SUMMARY OF THE INVENTION

It is an object of this invention to detente or defuse the present conflict in measuring out the best dose of solid magnetizable particles to be imbedded in a polymer matrix or network, this conflict being recognized by us, the inventors, between:

- a first goal of attaining high fatigue life and high crack growth resistance, both demanding a low or null dose of solid magnetizable particles, and
- a second goal of attaining a strong magnetic signal by passing discrete magnetized areas of a circumferential row of magnetized areas along a sensor, demanding a high dose of solid magnetizable particles.

In an environment—such as a vehicle—there exist many low magnetic influences. In view of the relatively great distance (ca. half an inch for passenger cars) between magnetized areas of a tire and a sensor, it is a further object of the invention to generate the intended sequence of signals by strong magnetic areas, avoiding misrecognition of the passing times of magnetic areas and thus avoiding mismeasurements of forces acting on a tire and missignals given to brake controllers or brake actuators.

We, the inventors, have recognized that in those rubber compositions known in the art, the solid magnetizable particles function as flaw sites to initiate cracking and component failure when subjected to repeated deformation. Evidence of this is provided in FIGS. 1 and 2, showing fatigue life and crack growth resistance of a standard black tire sidewall composition versus a composition A containing 200 phr of a ferrite filler.

The primary reason for this unintended effect is the great difference between the stiffness of the matrix and that of the solid magnetizable particles; unfortunately this primary reason is unavoidable. But with a stronger bonding between the matrix and the solid magnetizable particles, the loss of fatigue resistance and crack growth resistance will be reduced. Therefore we focussed our labor on enhancing bonding between solid magnetizable particles and surrounding molecules of the rubbery compounds.

As a solution, we provide a chemical coupling agent and also a special mixing technique to provide a chemical bond between the magnetized particles and the polymer matrix, thereby allowing additional mechanisms for fatigue and tearing energy dissipation. Such chemical coupling agents can be, but are not limited to, organo-functional silane materials. This invention allows the filling of a rubber composition with a high level of solid magnetizable particles, also described as "magnetic fillers", without diminishing too much fatigue resistance and crack growth resistance. Thus, magnetic fillers can be incorporated successfully in rubber compositions which are used for high flex components, especially for tire sidewalls.

Advantageously, our invention is facilitated by the fact that such organo-functional silane materials may be used which are already well-known in the rubber industry. However, up-to-date organo-functional silane materials are used only in rubber compositions for tire treads and not in compositions for tire sidewalls. In these tread rubber compositions, organo-functional silane materials are combined with silica and provide bonding of the silica to the polymer matrix; they are not combined with any solid magnetizable particle and therefore do not provide or disclose any bonding of such particles to the polymer matrix.

Beside the solid magnetizable particles, the rubber composition of the present invention contains molecules of natural and/or artificial polymer and/or other fillers such as carbon black, silica and/or other compounds such as sulfur, as a chain-building ingredient, vulcanizing accelerators, vulcanizing retarders and so on. These surrounding molecules are a matrix in which the solid magnetizable particles are imbedded.

Differences between this invention and other known arrangements include the use of chemical coupling agents to bond magnetic powder to the polymer matrix, and the special mixing technique to maximize reaction between coupling agent, magnetic powder, and polymer matrix.

DETAILED DESCRIPTION OF THE INVENTION

The disclosure of the preferred embodiments contains three parts. First, the reaction mechanism is modeled to provide an understanding of the nature of the chemical bonds between the magnetic filler, coupling agent, and polymer network. Second, experimental laboratory studies were performed to demonstrate benefits of using the coupling agents and the special mixing technique. Third, there is disclosed in detail the best way of processing such a rubber composition containing 2 to 8 phr by weight of an organosilane polysulfide.

Reaction Mechanism

It is proposed that the organo-functional silane coupling agents will have potential bonding sites at the strontium ferrite molecule as shown below. The organo-functional silane may bond to the ferrite in a similar mechanism as with silica.

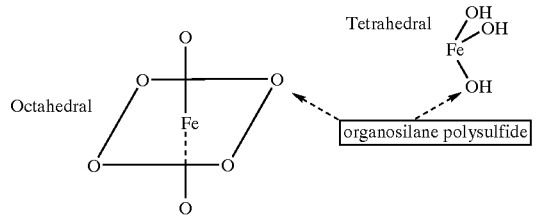

Experimental Description

A standard black sidewall recipe was modified to include from 50 phr up to 250 phr magnetic filler. Here for the experimental laboratory study, 200 phr of a strontium ferrite is used. Table A shows the standard black sidewall recipe and the magnetic ferrite sidewall compound A containing 200 phr of strontium ferrite.

TABLE A

| Ingredient | Standard Tire Black Sidewall phr | Ferrite Sidewall A phr |
|---|---|---|
| First Pass | | |
| NR | 55 | 40 |
| High Cis Br | 45 | 60 |
| N 660 Carbon Black | 52 | 48 |
| Aromatic Oil | 16 | 12 |
| Tackifying Resin | 3 | 3 |
| Antidegradants | 4.8 | 9.6 |
| Micro Crystalline Paraffin Wax | 2.2 | 2.2 |
| Zinc Oxide | 2.7 | 2.7 |
| Stearic Acid | 2 | 2 |
| Strontium Ferrite | — | 100 |
| Second Pass | | |
| N 660 Carbon Black | — | 4 |
| Aromatic Oil | — | 4 |
| Strontium Ferrite | — | 100 |
| Third Pass | | |
| TBBS Accelerator | .5 | .5 |
| Soluble Sulfur | 1.92 | 1.92 |

Figure 1:
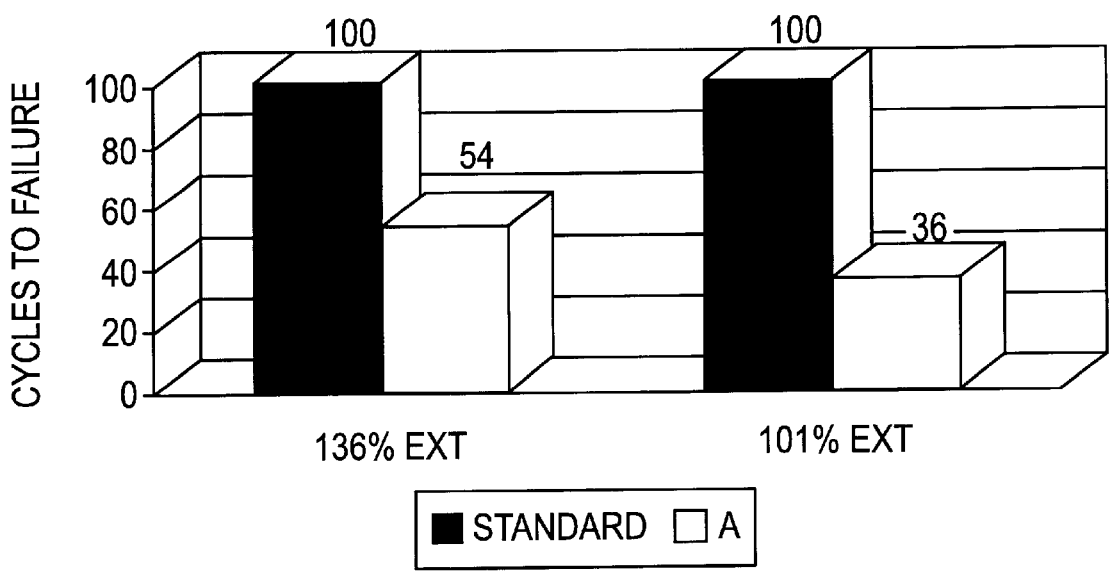
FIG. 1 shows the results of tests of fatigue until failure at different extensions "Ext". There is compared a prior art sample called "Standard" made of a vulcanized standard rubber composition for sidewalls without magnetizable particles and a prior art sample A made of nearly the same standard vulcanized rubber composition but additionally comprising 200 phr of a ferrite filler.
Figure 2:
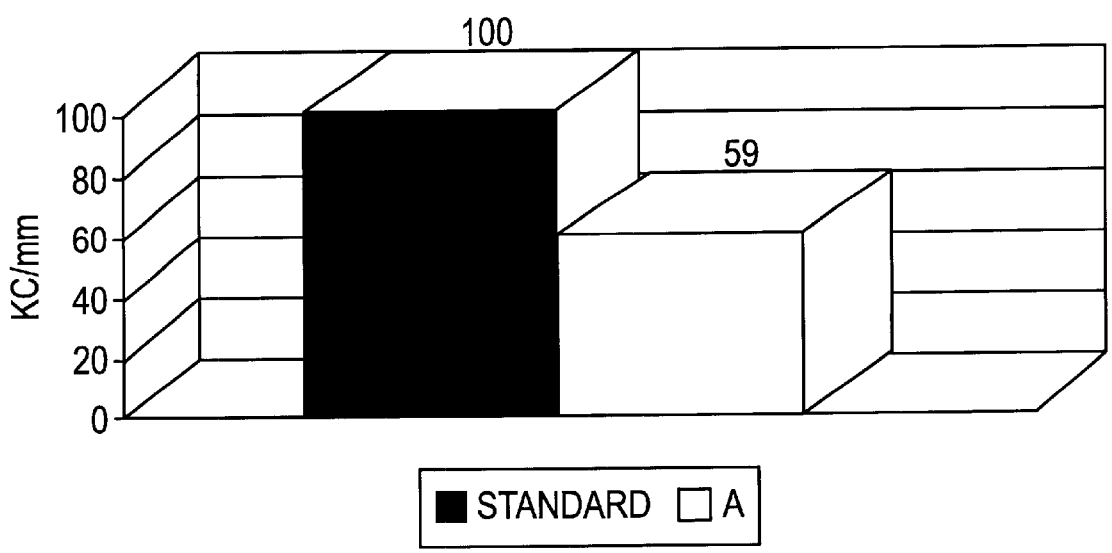
FIG. 2 shows the results of the well-known DeMattia test with pierced samples made of the same materials as in FIG. 1. "KC" denotes kilocycles, i.e., units of a thousand cycles of uploading and downloading. This number is divided by the length of crack growth, measured in millimeters, resulting in the dimension "KC/mm"

FIGS. 1 and 2 show the lower fatigue and crack resistance of compound A, despite the polymer blend modification to enhance fatigue life.

Table B shows ferrite sidewall A modified, named ferrite sidewalls B, C and D, having 4, 6 and 8 phr of TESPT (triethoxy silyl propyl tetrasulfide), respectively, and ferrite sidewall E having 4 phr of TESPD, (triethoxy silyl propyl disulfide), both organo-functional silane coupling agents.

TABLE B

| Ingredient | Standard Tire Black Sidewall phr | Ferrite Sidewall A phr | Ferrite Sidewall B phr | Ferrite Sidewall C phr | Ferrite Sidewall D phr | Ferrite Sidewall E phr |
|---|---|---|---|---|---|---|
| First Pass | | | | | | |
| NR | 55 | 40 | 40 | 40 | 40 | 40 |
| High Cis Br | 45 | 60 | 60 | 60 | 60 | 60 |
| N 660 Carbon Black | 52 | 48 | 48 | 48 | 48 | 48 |
| Aromatic Oil | 16 | 12 | 12 | 12 | 12 | 12 |
| Tackifying Resin | 3 | 3 | 3 | 3 | 3 | 3 |
| Antidegradants | 4.8 | 9.6 | 9.6 | 9.6 | 9.6 | 9.6 |
| Micro Crystalline Paraffin Wax | 2.2 | 2.2 | 2.2 | 2.2 | 2.2 | 2.2 |
| Zinc Oxide | 2.7 | 2.7 | 2.7 | 2.7 | 2.7 | 2.7 |
| Stearic Acid | 2 | 2 | 2 | 2 | 2 | 2 |
| Strontium Ferrite | — | 100 | 100 | 100 | 100 | 100 |
| TESPT | — | — | 2 | 3 | 4 | — |
| TESPD | — | — | — | — | — | 2 |
| Second Pass | | | | | | |
| N 660 Carbon Black | — | 4 | 4 | 4 | 4 | 4 |
| Aromatic Oil | — | 4 | 4 | 4 | 4 | 4 |
| Strontium Ferrite | — | 100 | 100 | 100 | 100 | 100 |

TABLE B-continued

| Ingredient | Standard Tire Black Sidewall phr | Ferrite Sidewall A phr | Ferrite Sidewall B phr | Ferrite Sidewall C phr | Ferrite Sidewall D phr | Ferrite Sidewall E phr |
|---|---|---|---|---|---|---|
| TESPT | — | — | 2 | 3 | 4 | — |
| TESPD | — | — | — | — | — | 2 |
| Third Pass | | | | | | |
| TBBS Accelerator | .5 | .5 | .5 | .5 | .5 | .5 |
| Soluble Sulfur | 1.92 | 1.92 | 1.92 | 1.92 | 1.92 | 1.92 |

Figure 3:
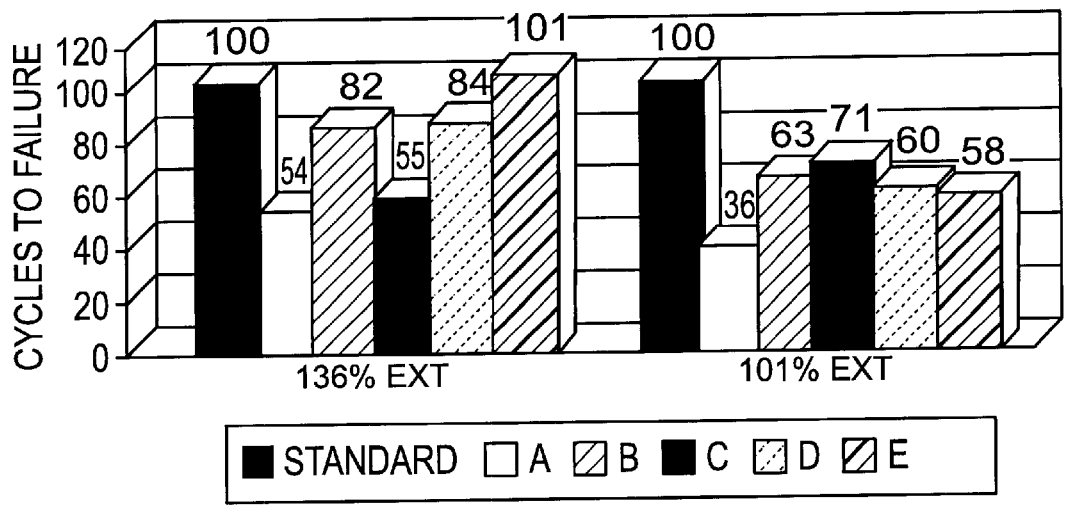
FIG. 3 shows in a way analogous to FIG. 1 the results of tests of fatigue until failure with samples of a vulcanized Standard rubber composition for sidewalls and vulcanized rubber compositions A to E according the invention, disclosed in detail in Table B.
Figure 4:
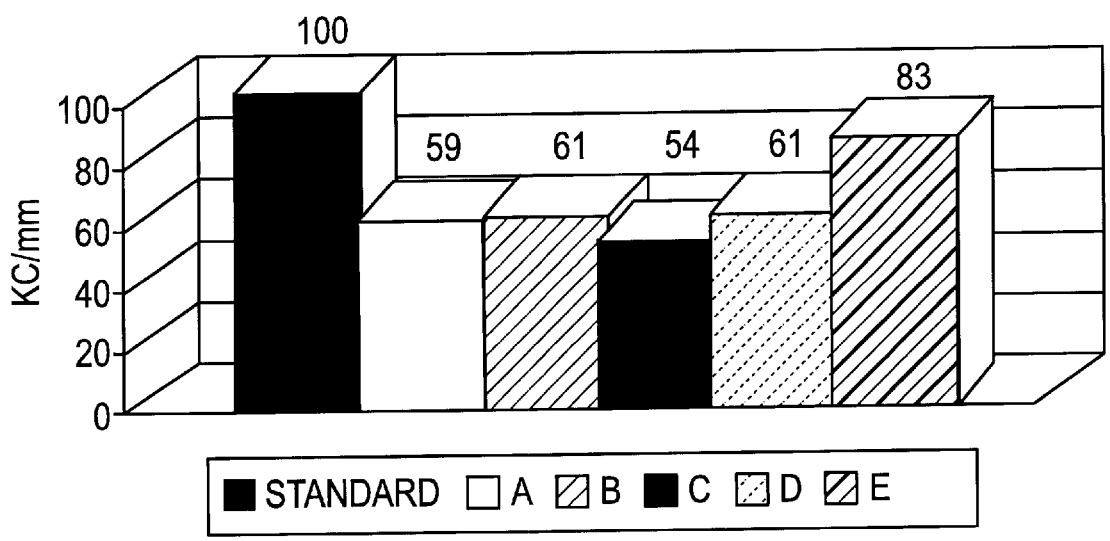
FIG. 4 shows in a way analogous to FIG. 3 the results of the DeMattia test with pierced samples made of rubber compositions A to E of FIG. 3.

FIG. 3 shows significant improvements in fatigue life with use of organo-functional silane coupling agents. FIG. 4 shows that there is not much improvement in crack growth resistance using TESPT, but a significant improvement can be realized using the TESPD material.

Table C displays the last study in this invention description utilizing 4 and 6 phr of TESPD coupling agent and a mixing technique to optimize the reaction of the coupling agent with the magnetic filler and polymer matrix. The mixing technique, shown in Table D, employs an internal rubber mixer. Half of the strontium ferrite and all of the TESPD are added together early in the first pass to begin the reaction sooner and to allow more time for completion of the reaction for greater bonding to the rubber matrix.

TABLE C

| Ingredient | Standard Tire Black Sidewall phr | Ferrite Sidewall A phr | Ferrite Sidewall F phr | Ferrite Sidewall G phr |
|---|---|---|---|---|
| First Pass | | | | |
| NR | 55 | 40 | 40 | 40 |
| High Cis BR | 45 | 60 | 60 | 60 |
| Strontium Ferrite | — | 100 | 100 | 100 |
| TESPD | — | — | 4 | 6 |
| N 660 Carbon | 52 | 48 | 48 | 48 |

TABLE C-continued

| Ingredient | Standard Tire Black Sidewall phr | Ferrite Sidewall A phr | Ferrite Sidewall F phr | Ferrite Sidewall G phr |
|---|---|---|---|---|
| Black | | | | |
| Aromatic Oil | 16 | 12 | 12 | 12 |
| Tackifying Resin | 3 | 3 | 3 | 3 |
| Antidegradants | 4.8 | 9.6 | 9.6 | 9.6 |
| Micro Crystalline Paraffin Wax | 2.2 | 2.2 | 2.2 | 2.2 |
| Zinc Oxide | 2.7 | 2.7 | — | — |
| Stearic Acid | 2 | 2 | 2 | 2 |
| Second Pass | | | | |
| N 660 Carbon Black | — | 4 | 4 | 4 |
| Aromatic Oil | — | 4 | 4 | 4 |
| Zinc Oxide | — | — | 2.7 | 2.7 |
| Strontium Ferrite | — | 100 | 100 | 100 |
| Third Pass | | | | |
| TBBS Accelerator | .5 | .5 | .5 | .5 |
| Soluble Sulfur | 1.92 | 1.92 | 1.92 | 1.92 |

As the third part of this disclosure, Table D shows the progressive new procedure according to the invention to produce a vulcanizable rubber composition.

TABLE D

Standard Mixing Procedure vs. Optimized Reaction Procedure
Farrel Banbury (BR Series)

| Item | Standard Procedure | Optimized Procedure |
|---|---|---|
| 1st Master | | |
| Step 1 | Start Temp. = 50° C. (122° F.); rpm = 77 | Start temp. = 50° C. (122° F.); rpm = 77 |
| Step 2 | Add polymers within 15 sec. | Add polymers within 15 sec. |
| Step 3 | Add ½ strontium ferrite + resins + others (excl. wax & stearic acid) @ 1 min. (77 rpm > 116 rpm) | Add ½ strontium ferrite and all TESPD @ 45 sec. (77 rpm > 116 rpm) |
| Step 4 | Add ¼ strontium ferrite + wax + stearic acid + ½ TESPD @ 2 min. (77 rpm > 116 rpm) | Add remaining ingredients (except oil) @ 1 min. 15 sec. (77 rpm > 116 rpm) |
| Step 5 | Add oil @ 3 min. (77 rpm > 116 rpm) | Add oil @ 2 min. (77 rpm > 116 rpm) |
| Step 6 | Clean and sweep ram @ 4 min. (116 rpm) | Clean and sweep ram @ 2 min. 45 sec. (116 rpm) |
| Step 7 | Discharge at 149° C. (300° F.) Maximum mixing cycle = 6 min. | Discharge at 149° C. (300° F.) Maximum mixing cycle = 6 min. |
| 2nd Master | | |
| Step 1 | Start temp. = 50° C. (122° F.) | Start temp. = 50° C. (122° F.) |
| Step 2 | Add 1st master, then ram down | Add 1st master, then ram down |

TABLE D-continued

Standard Mixing Procedure vs. Optimized Reaction Procedure
Farrel Banbury (BR Series)

| Item | Standard Procedure | Optimized Procedure |
|---|---|---|
| Step 3 | (77 rpm > 116 rpm) Add remaining ingredients, incl. ½ strontium ferrite and ½ TESPD @ 1 min. (77 rpm > 116 rpm > 155 rpm) | (77 rpm > 116 rpm) Add remaining ingredients incl. ½ strontium ferrite and oil @ 30–45 sec. (77 rpm > 116 rpm) |
| Step 4 | Discharge at 149° C. (300° F.) Maximum mixing cycle = 4 min. | Discharge at 149° C. (300° F.) Maximum mixing cycle = 4 min. |
| Finish | | |
| Step 1 | Start temp. = 38° C. (100° F.) | Start temp. = 50° C. (122° F.) |
| Step 2 | Add ½ $2^{nd}$ master + curatives + ½ $2^{nd}$ master | Add $2^{nd}$ master and curatives (77 rpm) |
| Step 3 | Ram down by 30 sec. (77 rpm) | Ram down by 30 sec. (77 rpm > 116 rpm) |
| Step 4 | Discharge at 93.3° C. (200° F.) Maximum mixing cycle = 2.5 min. | Discharge at 93.3° C. (200° F.) Maximum mixing cycle = 2.5 min |

Figure 5:
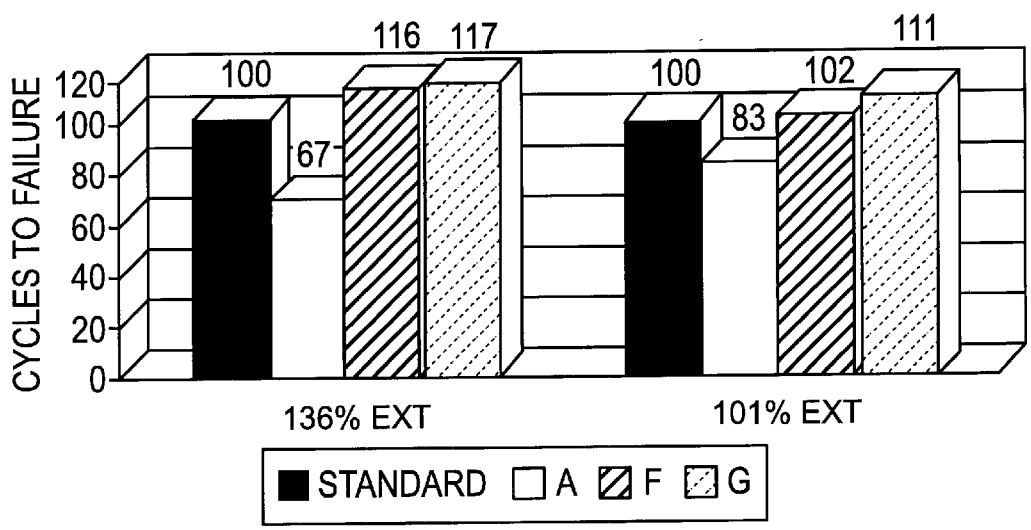
FIG. 5 shows in a way analogous to FIG. 1 and FIG. 3 the results of tests of fatigue until failure with samples of a vulcanized Standard rubber composition for sidewalls and vulcanized rubber compositions A, F and G according the invention, disclosed in detail in Table C.
Figure 6:
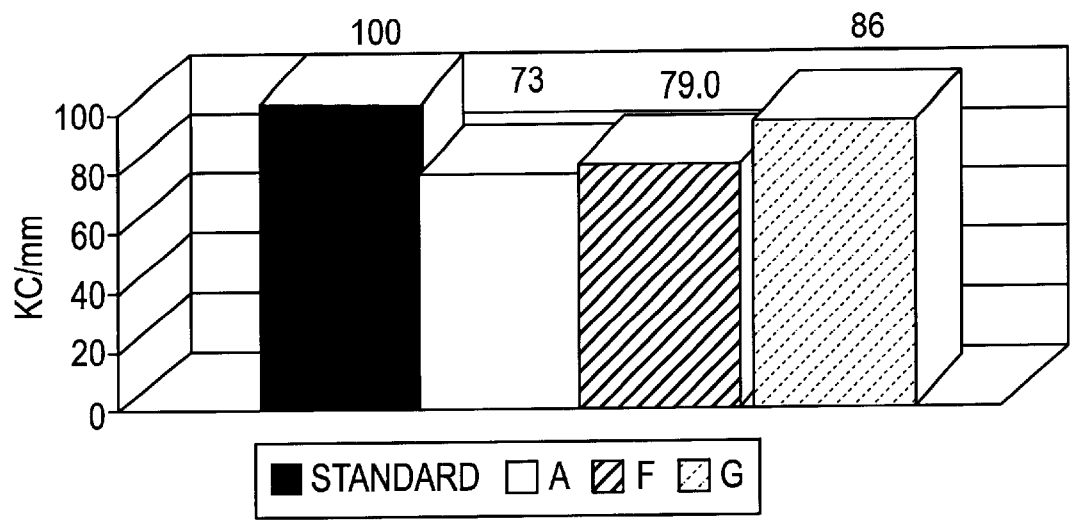
FIG. 6 shows in a way analogous to FIG. 2 and FIG. 4 the results of the DeMattia test with pierced samples made of rubber compositions A, F and G of FIG. 5.

FIG. 5 shows that fatigue life is significantly improved, actually slightly better than the standard tire black sidewall, with TESPD at either 4 or 6 phr and using the mixing technique to optimize reaction between the magnetic filler and the polymer matrix. FIG. 6 shows that crack growth resistance is significantly improved over ferrite compound A and only slightly less than the standard tire side wall, but still a satisfactory production compound.

The preferred versions of this invention are as follows:
Magnetic filler type: strontium ferrite
Magnetic filler loading range: 50 phr to 250 phr
Coupling agents: TESPT and TESPD
Coupling agent loading range: 2 to 8 phr
Natural rubber phr range: 20 to 70 phr
Polybutadiene phr range: 20 to 70 phr
Emulsion SBR phr range: 10 to 30 phr
Carbon black phr range: 25 to 60 phr
Carbon black type: N 660, N 339, N 550
Processing oil phr range: 8 to 20 phr
Processing oil type: aromatic and naphthenic
Tackifying resin phr range: 0 to 6 phr
Tackifying resin types: phenolic and hydrocarbon
Antidegradants phr range: p-phenylenediamine class
Micro crystalline paraffm wax phr range: 2 to 6 phr
Zinc oxide phr range: 2 to 6 phr
Stearic acid phr range: 1 to 4 phr
Accelerator type: TBBS and CBS
Accelerator phr range: 0.3 to 1.5 phr
Sulfur type: soluble sulfur and/or 20% oil treated crystex
Sulfur phr range (soluble sulfur): 1.5 to 2.5 phr
Sulfur phr range (oil treated crystex): 1.88 to 3.13 phr
All measurements given in "phr" units are by weight.

This invention allows high loadings of non-reinforcing or low reinforcing magnetic powder in the tire sidewall compound for the Sidewall Torsion Sensor system while maintaining the proper sidewall compound performance.

The present invention can be applied to all tire types using the Sidewall Torsion Sensor system and to all other rubber articles generating magnetic signals as—by way of example—driving or conveyor belts for the purpose of counting the number of revolutions executed.

What is claimed is:

1. A magnetizable sidewall for a vehicle tire comprising a rubber composition comprising:
    100 parts by weight of at least one sulfur vulcanized elastomer selected from at least one conjugated diene homopolymers or copolymers;
    50 to 250 phr by weight solid magnetizable ferrite particles, the ferrite particles having a greater stiffness than the at least one sulfur vulcanized elastomer; and
    2 to 8 phr by weight organosilane polysulfide bonding the elastomer with the ferrite particles.

2. The sidewall of claim 1, wherein the at least one elastomer comprises at least one copolymer of at least one conjugated diene and at least one aromatic vinyl compound.

3. The sidewall of claim 1, wherein the ferrite particles comprise strontium ferrite.

4. The sidewall of claim 1, wherein the ferrite particles comprise barium ferrite.

5. The sidewall of claim 1, wherein the ferrite particles comprise barium ferrite and strontium ferrite.

6. The sidewall of claim 1, wherein the organosilane polysulfide comprises at least one of 3,3'-bis(triethoxysilylpropyl) tetrasulfide or 3,3'-bis-(triethoxysilylpropyl) disulfide.

7. The sidewall of claim 1, wherein the sidewall is a radially outer sidewall.

8. The sidewall of claim 1 determined to be positioned at the axial inside of a vehicle.

9. A vehicle tire comprising only one sidewall according to claim 1, the sidewall determined to be positioned at the axial inside of a vehicle.

10. A vehicle tire according to claim 9, the sidewall being magnetized in discrete intervals along its circumference.

11. The sidewall of claim 10, wherein the sidewall is an outer sidewall.

12. A vehicle having rotating wheels equipped with tires and a braking system, each tire comprising at least one sidewall according to claim 1, the sidewall being an outer sidewall which is magnetized in discrete intervals along its circumference, and a sensor for detecting signals generated at said discrete intervals as the sidewall passes the sensor during rotation.

13. A magnetizable sidewall for a vehicle tire comprising a rubber composition comprising by weight:
    20 to 100 phr natural rubber;
    50 to 250 phr strontium ferrite;
    2 to 8 phr of 3,3'-bis-(triethoxysilylpropyl) tetrasulfide or 3,3'-bis-(triethoxysilylpropyl) disulfide bonding the rubber and the strontium ferrite;
    25 to 60 phr of at least one carbon black,
    8 to 20 phr processing oil, 4 to 10 phr p-phenylene diamine antidegradant, 2 to 6 phr micro crystalline paraffin wax, 2 to 6 phr zinc oxide, 1 to 4 phr stearic acid, 0.3 to 1.5 phr accelerator selected from at least one of benzothiazyl-2-tert-butyl sulfenamide or benzothiazyl-2-cyclohexyl sulfenamide; and 1.5 to 2.5 phr sulfur.

14. A process for preparing a rubber composition, wherein the rubber composition comprises about 100 parts by weight of at least one sulfur vulcanizable elastomer selected from conjugated diene homopolymers and copolymers, 50 to 250 phr solid magnetizable ferrite particles, 2 to 8 organosilane polysulfide bonding the elastomer and the ferrite particles, accelerator(s), and sulfur, comprising at least three mixing stages of:

1) preparing a first master batch by mixing all of the at least one elastomer, half of the ferrite particles and all of the organosilane polysulfide, 2) preparing a second master batch by mixing the first master batch with all remaining ingredients, including the other half of the ferrite particles, and not including the accelerators and sulfur, 3) completing the rubber composition by mixing the second batch with the accelerators and sulfur.

15. The process of claim 14, wherein the at least one elastomer comprises at least one copolymer of at least one con ted diene and at least one aromatic vinyl compound.

16. The sidewall of claim 14, wherein the ferrite particles comprise strontium ferrite.

* * * * *